_United States Patent_ [19]

Anello et al.

[11] 3,879,440

[45] Apr. 22, 1975

[54] TERTIARY AMINE SULFAMIC ACID SALTS OF POLYFLUOROISOALKOXYALKYL CARBAMATES

[75] Inventors: Louis Gene Anello, Basking Ridge; Richard F. Sweeney, Randolph Township, Dover, Morris County, both of N.J.

[73] Assignee: Allied Chemical Corporation, New York, N.Y.

[22] Filed: Nov. 8, 1968

[21] Appl. No.: 774,532

[52] U.S. Cl.......... 260/470; 260/468 E; 260/481 C; 117/121
[51] Int. Cl............................................ C07c 143/63
[58] Field of Search............................ 260/470, 615

[56] References Cited
UNITED STATES PATENTS

| | | |
|---|---|---|
| 2,713,593 | 7/1955 | Brice et al. ............... 260/615 X |
| 2,826,564 | 3/1958 | Bovey et al. .............. 260/615 X |
| 2,839,513 | 6/1958 | Ahlbrecht et al. ........ 260/615 X |
| 2,917,409 | 12/1959 | Green ............................ 260/470 |
| 3,293,306 | 12/1966 | LeBlue et al. ............... 260/615 |
| 3,358,033 | 12/1967 | Anello et al. ............. 260/615 X |
| 3,388,078 | 6/1968 | Evans et al. .............. 260/615 X |
| 3,424,785 | 1/1969 | Pittman et al. ........... 260/615 X |

*Primary Examiner*—John F. Terapane
*Attorney, Agent, or Firm*—Anthony J. Stewart; Jay P. Friedenson

[57] ABSTRACT

Tertiary amine sulfamic acid salts of polyfluoroisoalkoxyalkyl carbamates characterized in that the polyfluoroisoalkoxyalkyl moiety has an ether oxygen linking a fluorinated carbon atom attached to two fluoroalkyl groups and at least one $-CF_2-$ group. These compounds are useful to impart oil repellency to textiles.

3 Claims, No Drawings

TERTIARY AMINE SULFAMIC ACID SALTS OF POLYFLUOROISOALKOXYALKYL CARBAMATES

This invention relates to novel fluorocarbon compounds. More particularly this invention relates to tertiary amine sulfamic acid salts of polyfluoroisoalkoxyalkyl-substituted carbamates useful to impart oil repellency to textiles.

Tertiary amine sulfamic acid salts of fluorine-containing carbamates are known and have the advantage that they can be applied to textiles as oil repellency agents from aqueous dispersions without the need of additional dispersing agents. For example U.S. Pat. No. 2,917,409 discloses such salts prepared by reacting an organic diisocyanate, a tertiary amine salt and a fluoroalcohol of the formula $$X(CF_2)_nCH_2OH$$

wherein X is hydrogen or halogen and $n$ is an integer from 4 to 12. These compounds are useful to impart oil repellency to textiles, but their effectiveness is limited and relatively large amounts of these compounds, on the order of from 3–6%, by weight of the fabric, are required, adding materially to the cost of treating textiles.

Accordingly, it is an object of the present invention to provide novel fluorocarbon compounds useful as oil repellents.

It is another object to provide novel tertiary amine salts of fluorocarbamates which are highly effective oil repellents at low concentration.

Further objects will become apparent from the following detailed description thereof.

We have discovered novel tertiary amine salts of fluorocarbamates having the formula

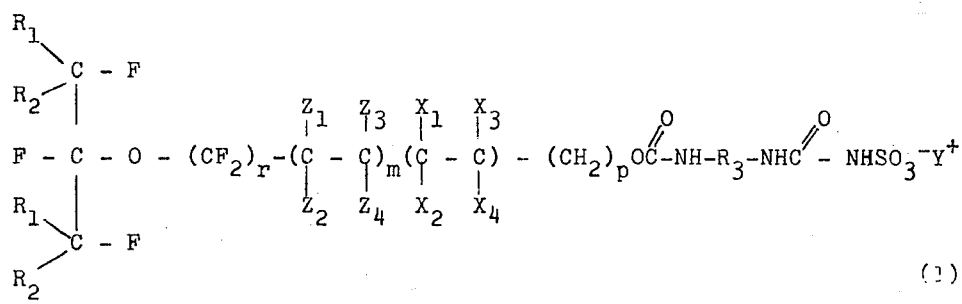

(1)

wherein $R_1$ and $R_2$ independently at each occurrence can be fluorine, chlorine, perfluoroalkyl or together can form a cyclic perfluoroalkylene group, with the proviso that both $R_1$ and $R_2$ cannot be chlorine; $Z_1$, $Z_2$, $Z_3$ and $Z_4$ are independently hydrogen, fluorine or chlorine providing that no more than two of $Z_1$–$Z_4$ are chlorine; $X_1$, $X_2$, $X_3$ and $X_4$ are independently hydrogen, chlorine or fluorine providing no more than one of $X_1$–$X_4$ is chlorine; $r$ is an integer from 1–2; $m$ and $n$ are integers from 0–75; the sum of $m$ and $n$ is from 0–75; $p$ is an integer of 0 or 1 providing that when $p$ is 0, $n$ must be at least one and $X_3$ and $X_4$ must be hydrogen; $R_3$ is an alkylene, arylene or cycloalkylene group which can be unsubstituted or substituted with groups that are inert to isocyanate groups; and $Y^+$ is a positively charged tertiary amine residue. Preferably, $m$ and $n$ are integers from 0–10. These salts are useful as oil repellency agents for textiles as well as other substrates including fibers, papers, and the like. They can be applied from aqueous solution, eliminating the need for dispersing agents and/or expensive solvents and are effective at comparatively low loading.

The criticality in the structure of these salts is in the fluoroisoalkoxyalkyl tail portion wherein an ether oxygen links a fluorinated carbon atom attached to two fluoroalkyl groups and at least one $-CF_2-$ group.

The compounds of the invention can be prepared by reacting a polyfluoroisoalkoxyalkyl alcohol having the formula

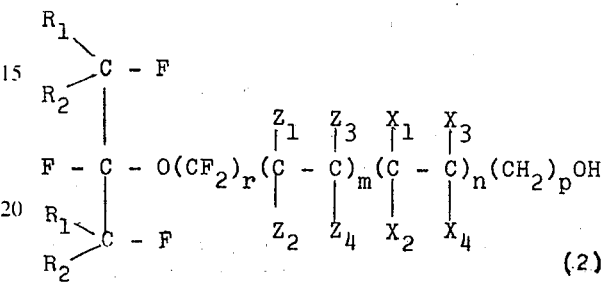

(2)

wherein $R_1$, $R_2$, $Z_1$–$Z_4$, $X_1$–$X_4$, $r$, $m$, $n$ and $p$ have the meanings given above, with an organic diisocyanate and a tertiary amine salt of sulfamic acid. Essentially, one mol of each reactant is employed. The resultant sulfamic acid salts can be reacted with an alkali metal salt to form the corresponding alkali metal sulfamic acid salt of the carbamate.

In a preferred method of preparation, a suitable diisocyanate and a fluoroisoalkoxyalkyl alcohol are reacted first in a water-miscible organic solvent, such as dimethylformamide, dioxane or tetrahydrofuran, in the presence of a basic catalyst to form the monocarbamate adduct. The monocarbamate products are disclosed in greater detail in our copending application (5300-1276) filed concurrently herewith entitled "Polyfluoroalkoxyalkyl-Substituted Carbamates". This monocarbamate adduct is then reacted with a solution of a tertiary aliphatic amine salt of sulfamic acid in the solvent. The reactions are exothermic and are completed in a short time.

Alternatively, the diisocyanate can be reacted with the amine salt of the sulfamic acid and the resultant adduct reacted with an alcohol as hereinabove described. It will be apparent that if the diisocyanate is asymmetric and contains isocyanate groups of different reactivity, position isomers of the products will be obtained depending upon the order of addition of the reactants. Similarly, if all three of the reactants are admixed simultaneously, mixtures of isomers will be obtained when the diisocyanate is asymmetric.

The alcohols described in formula (2) above can be prepared from their corresponding polyfluoroisoalkoxyalkyl iodides. The iodides and their preparation are disclosed in greater detail in copending U.S. application Ser. No. 633,359 filed Apr. 25, 1967, now U.S. Pat No. 3,361,721. The pertinent details of that application are hereby incorporated by reference. These iodides are prepared by reacting polyfluoroisoalkoxytetrafluoroalkyl iodides of the formula

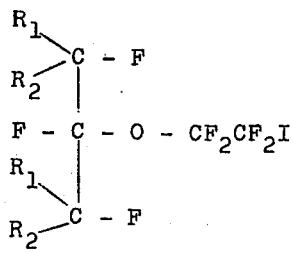   (3)

wherein $R_1$ and $R_2$ have the meanings given above, with telomerizable compounds having the formulas $Z_1Z_2C=CZ_3Z_4$ and/or $X_1X_2C=CX_3X_4$ wherein $Z_1-Z_4$ and $X_1-X_4$ have the meanings given above. Suitable telomerizable compounds include ethylene, tetrafluoroethylene, chlorodifluoroethylene, difluoroethylene and the like. The telomerization reaction can be initiated by heat e.g. temperatures from about 100°C. to about 350°C., preferably from about 150° to 200°C., or by a free radical initiator, e.g. azobisisobutyronitrile, benzoyl peroxide and the like.

The polyfluoroisoalkoxytetrafluoroalkyl iodides can be prepared by reacting a corresponding halogenated ketone with an ionizable fluoride salt, e.g. CsF or KF, to form a fluorinated organic salt and reacting the organic salt with tetrafluoroethylene and iodine. Preparation of the polyfluoroisoalkoxytetrafluoroalkyl iodides is described in greater detail in copending U.S. applications of Litt et al., Ser. Nos. 492,276 filed Oct. 1, 1965 and 513,574 filed Dec. 13, 1965. The pertinent subject matter of these applications is hereby incorporated by reference.

The following series of equations will serve to further illustrate the preparation of the polyfluoroisoalkoxyalkyl iodides, wherein $R_1$, $R_2$, $Z_1-Z_4$, $X_1-X_4$, $m$ and $n$ have the meanings given above.

1. 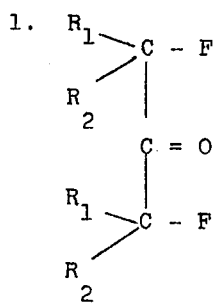 + KF ⟶ 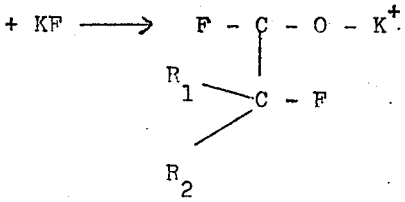

2. 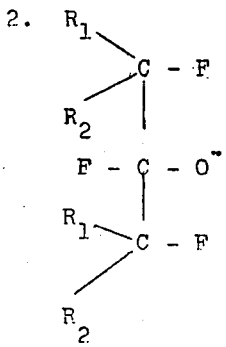 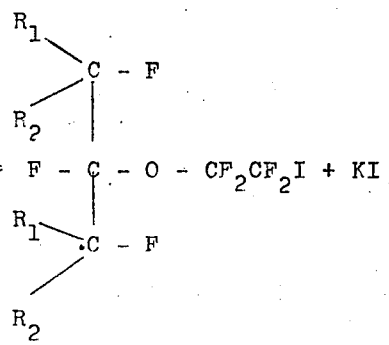

3. 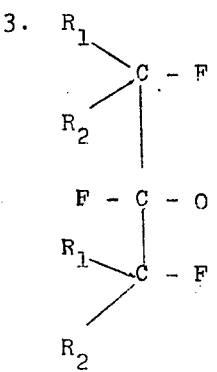 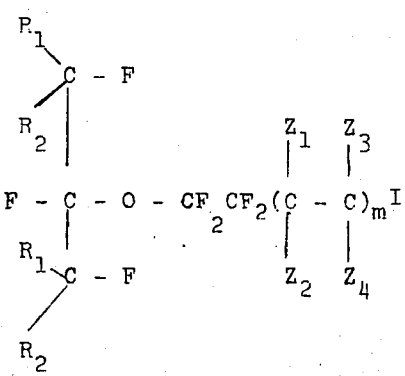

4. 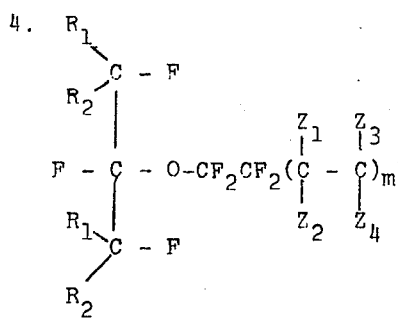 + $nX_1X_2C=CX_3X_4 \rightarrow$ 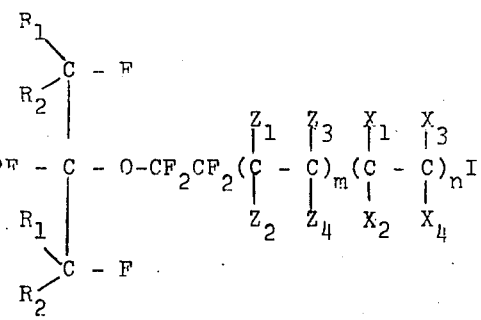

It will be understood that when $m$ and/or $n=0$, the corresponding telomerization equations 3 and/or 4 are omitted.

The alcohols hereinbefore described can be prepared from the corresponding telomer iodides in various ways. For example, alcohols having at least three terminal —$CH_2$— groups can be prepared by reacting a suitable polyfluoroisoalkoxyalkyl iodide with an unsaturated alcohol having the desired number of carbon atoms to form the iodoalcohol and reducing the iodoalcohol with a mild reducing agent such as lithium aluminum hydride or zinc and alcohol.

The alcohols can also be prepared by reacting a suitable iodide as described above with sulfur trioxide to form the pyrosulfate, or with oleum to form the hydrosulfate and hydrolyzing the pyrosulfate or hydrosulfate to the alcohol with aqueous acid.

These and other telomer alcohols of formula (2) are described in greater detail in copending U.S. application Ser. No. 721,089 filed Apr. 12, 1968, now U.S. Pat. No. 3,666,768. The pertinent subject matter of that application is hereby incorporated by reference.

A preferred class of alcohols within the scope of the general formula (2) have the formula

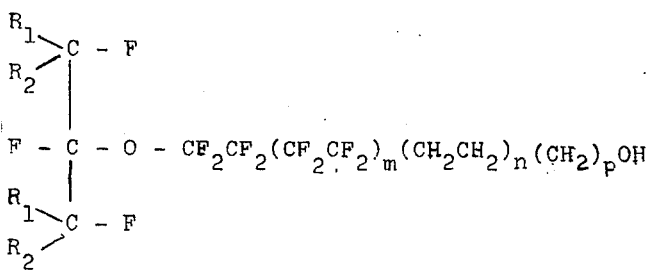

wherein $R_1$ and $R_2$ are independently fluorine or perfluoroalkyl groups of 1 to 2 carbon atoms, $m$ and $n$ are integers from 0–10, and $p$ is 0 or 1.

The diisocyanates suitable for use in the invention include known aromatic, e.g. toluene aliphatic and alicyclic diisocyanates which can be unsubstituted or substituted with one or more substituents which are inert to isocyanate groups. For example, toluene-2,4-diisocyanate, m-phenylene diisocyanate, 4-chloro-1,3-phenylene diisocyanate, 4,4'-biphenylene diisocyanate, 1,5-napthalene diisocyanate, 1,4-tetramethylene diisocyanate, 1,6-hexamethylene diisocyanate, 1,10-decamethylene diisocyanate, 1,18-octadecamethylene diisocyanate, 1,4-cyclohexyl diisocyanate, 4,4'-methylene bis(cyclohexylisocyanate), 1,5-tetrahydronaphthalene diisocyanate and the like can be employed.

The tertiary amine salts of sulfamic acid useful in the invention can be substituted with straight or branched chain aliphatic or alicyclic groups or with various combinations thereof. Suitable known amine salts include trimethylamine, triethylamine, triisooctylamine, tripropylamine, tri-t-butyl amine, methyldiethyl amine, dimethylisopropylamine, methylethylcyclohexylamine, and diethylcyclohexylamine salts of sulfamic acid and the like.

When preparing the compounds of the invention, the amounts of reactants used should be essentially stoichiometric. Thus for each mol of diisocyanate, essentially one mol of polyfluoroisoalkoxyalkyl alcohol and essentially one mol of the tertiary amine salt of sulfamic acid is employed. When preparing the tertiary aliphatic amine salt of sulfamic acid, a slight excess of the amine is preferably employed in order to prevent the reaction mixture from becoming acidic, which may promote side reactions and decomposition of the diisocyanate reactant. The reactants can be warmed for a short time to ensure complete reaction.

The compounds of the invention can be employed as textile treating agents directly from the solution in which they are formed. The reaction mixture can be diluted to the strength desired either with a solvent or, preferably, with water. Textiles can be treated in conventional manner with the resultant solution or dispersion, as by dipping, padding, spraying, brushing and the like. Generally from about 0.01% to about 5.0% by weight, preferably from about 0.1% to about 2.0% by weight of solids based on the weight of the textile to be treated, imparts excellent oil repellency. The treated textile is then dried to remove water and solvent and cured for about 1 to 5 minutes at a temperature between about 100°C. to about 170°C.

The compounds of the invention have surface activity and thus can also be used as surface active agents to reduce the surface tension of water or aqueous solutions.

The invention will be further illustrated by the following examples but it is to be understood that the invention is not meant to be limited to the details disclosed therein. In the examples, all parts and percentages are by weight unless otherwise noted.

In the examples, the compounds of the invention were evaluated as oil repellents as follows: a 4 inches × 4 inches swatch of cotton print cloth was padded to 100% wet pick up, with a dispersion of the test compound prepared by diluting a solution of the compound with a 90% water/10% oil acetone mixture to obtain a dispersion containing 1% of the compound. The cloth was dried and cured at 125°C. for 5 minutes. Oil repellency was determined according to the method described in pages 323–4 of the April, 1962 edition of the Textile Research Journal. According to this procedure, drops of mixtures of mineral oil and n-heptane in varying proportions are gently placed on the treated fabric and are allowed to stand for three minutes. At this time the wetting and penetration by the drops on the fabric is observed. The number corresponding to the mixture containing the highest percentage of heptane which does not penetrate or wet the fabric is taken as the oil repellency of the treated fabric. A rating of 90 or higher is considered excellent.

Water repellency was determined according to AATCC test method 22-1952.

EXAMPLE 1

4-Heptafluoroisopropoxy-3,3,4,4-tetrafluorobutyl iodide (38 parts) having a boiling point of 85°–87°C./100 mm were charged to a vessel fitted with a stirrer, dropping funnel, thermometer and a condenser connected to a trap at −78°C. 28 Parts of stabilized sulfur trioxide were added, maintaining the temperature at 35°–40°C. Iodine was precipitated during the reaction. The mixture was heated to 70°C. and held for two hours to complete formation of the pyrosulfate product. The mixture was cooled to room temperature and 100 parts by volume of 35% sulfuric acid were added slowly to hydrolyze the pyrosulfate to the alcohol. A small amount of sodium sulfite was added to remove any elemental iodine, and the mixture heated for one hour at 105°C. Two layers formed on standing. The aqueous layer was washed with ether and the extract combined with the organic layer. The organic product was distilled by use of a spinning band column.

A 70% yield of 4-heptafluoroisopropoxy-3,3,4,4-tetrafluorobutanol was recovered having a boiling point of 84°C./59 mm.

Elemental analysis calculated for $C_7F_{11}H_5O_2$: C, 25.5; F, 63.3; H, 1.6 Found: C, 24.9; F, 62.6; H, 1.6.

The alcohol prepared above (16.5 parts) was added slowly to a premixed solution containing 8.7 parts of toluene-2,4-diisocyanate and 5 drops of triethylamine in 25 parts of dimethylformamide. The temperature of the mixture rose to 58°C. and was cooled to room temperature. A solution of the triethylamine salt of sulfamic acid prepared separately by mixing 7.2 parts of triethylamine, 6.5 parts of sulfamic acid and 14 parts of dimethylformamide, was added to the reaction mixture. The mixture was maintained at 38°–40°C. for one hour. The product was recovered by vacuum distillation.

The structure of triethyl ammonium o-methyl-m-(4-heptafluoroisopropoxy-3,3,4,4-tetrafluorobutoxycarbamate)-carbamilyl sulfamate

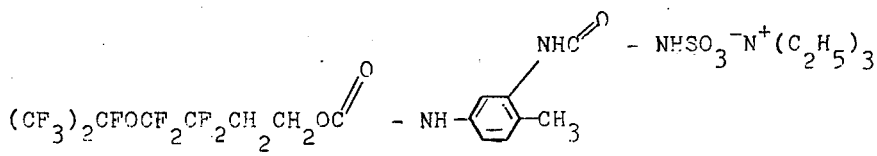

was confirmed by infrared analysis.

Elemental analysis calculated for $C_{22}F_{11}H_{28}O_7N_4S$: C, 37.6; F, 29.8; H, 4.1 S, 4.6. Found: C, 38.1; F, 30.1; H, 4.5; S, 5.0.

Cotton fabric treated with a solution of this compound had an oil repellency rating of 90.

EXAMPLE 2

One hundred parts of 6-heptafluoroisopropoxy-3,3,4,4,-5,5,6,6-octafluoro-1-hexyl iodide was added to a vessel containing 200 parts of 20% oleum preheated to 90°C. The reaction mixture was stirred at 100°C. for one hour and cooled to room temperature. 840 Parts of water were added slowly while the reaction temperature rose to 70°C. The mixture was heated at 100°C. for 16 hours. The mixture was washed with sodium thiosulfate solution to remove any elemental iodine and the oily product was recovered, dried and distilled.

A 63% yield (50.2 parts) of 6-heptafluoroisopropoxy-3,3,4,4,5,5,6,6-octafluoro-1-hexanol were obtained having a boiling point of 63°C./4 mm.

Elemental analysis calculated for $C_9F_{15}H_5O_2$: C, 25.1; F, 66.3; H, 1.2. Found: C, 24.5; F, 66.4; H, 1.2.

Following the procedure given in Example 1, 3.24 parts of toluene-2,4-diisocyanate were reacted with 8 parts of the alcohol prepared as above in 13 parts of dimethylformamide. The reaction temperature rose to 52°C. A solution containing 2.32 parts of sulfamic acid, 2.42 parts of triethylamine and 7 parts of dimethylformamide was added.

The structure of triethyl ammonium p-methyl-m-(6-heptafluoroisopropoxy-3,3,4,4,5,5,6,6-octafluorohexoxycarbamate)-carbamilyl sulfamate.

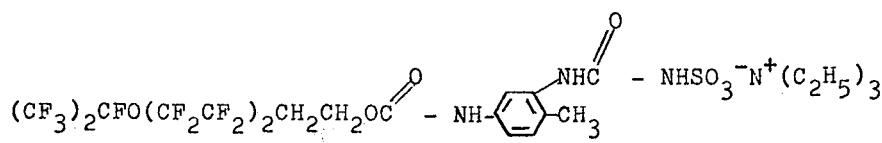

was confirmed by infrared analysis.

Cotton fabric treated with a solution of this compound had an oil repellency rating of 90.

EXAMPLE 3

Following the procedure of Example 1, 8.41 parts of 1,6-hexamethylenediisocyanate were reacted wtih 16.5

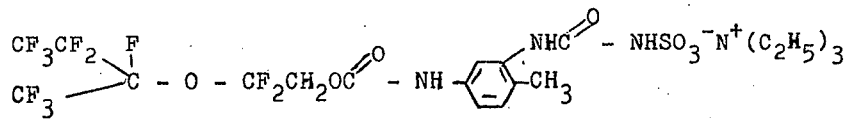

parts of the alcohol prepared as in Example 1 in 26 parts of dioxane. When reaction was complete, a solution of 4.7 parts of sulfamic acid, 5.0 parts of triethylamine and 15 parts of dioxane was added.

Triethyl ammonium 1-(4-heptafluoroisopropoxy-3,3,4,4-tetrafluorobutoxycarbamato)hexane-6-carbamoyl sulfamate of the formula

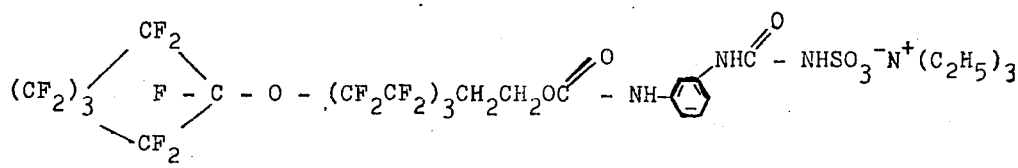

was recovered and its structure confirmed by infrared analysis.

Further compounds illustrative of the invention are prepared in similar manner, substituting appropriate starting materials, as follows.

EXAMPLE 4

Following the procedure of Example 1 but substituting the appropriate alcohol, a salt of the formula

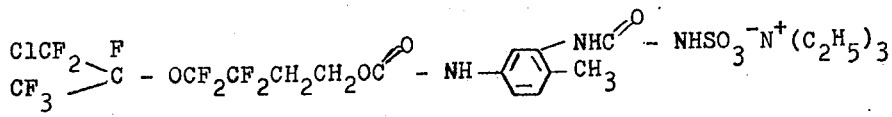

is prepared.

EXAMPLE 5

Following the procedure of Example 1 but substituting the appropriate alcohol, a salt of the formula is prepared.

EXAMPLE 6

Following the procedure of Example 1 but substituting the appropriate alcohol, a salt of the formula

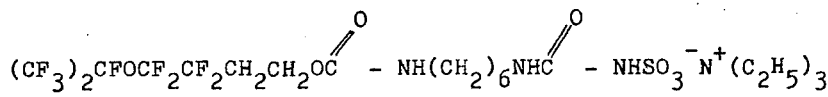

is prepared.

EXAMPLE 7

Following the procedure of Example 1 but substituting the appropriate alcohol, a salt of the formula

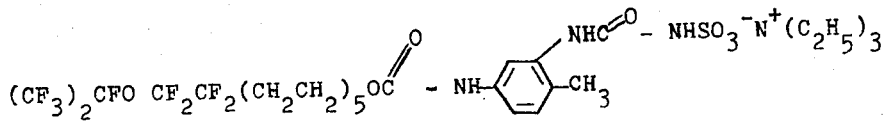

is prepared

EXAMPLE 8

Following the procedure of Example 1 but substituting the appropriate diisocyanate, a salt of the formula

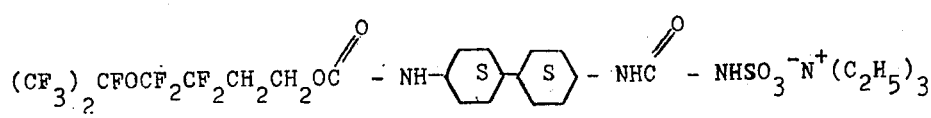

is prepared

EXAMPLE 9

Following the procedure of Example 2 but substituting the appropriate diisocyanate, a salt of the formula

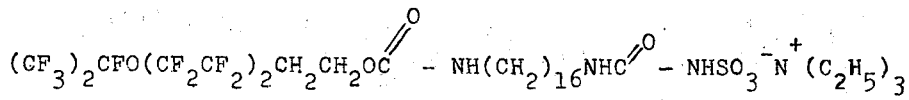

is prepared

EXAMPLE 10

Following the procedure of Example 3 but substituting the appropriate tertiary amine salt; a salt of the formula

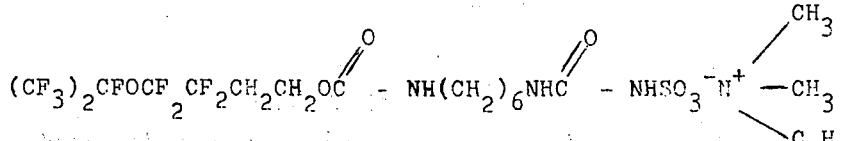

is prepared

EXAMPLE 11

Following the procedure of Example 1 but substituting the appropriate tertiary amine salt, a salt of the formula

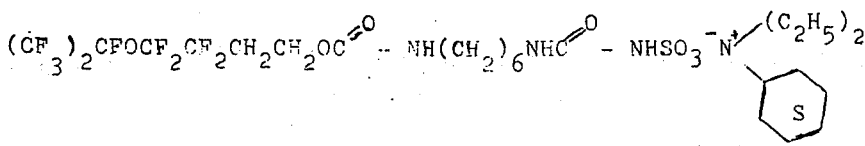

is prepared.

It will be apparent that numerous modifications and variations may be effected without departing from the novel concepts of the present invention and the illustrative details disclosed are not to be construed as imposing undue limitations on the invention.

We claim:

1. A compound of the formula:

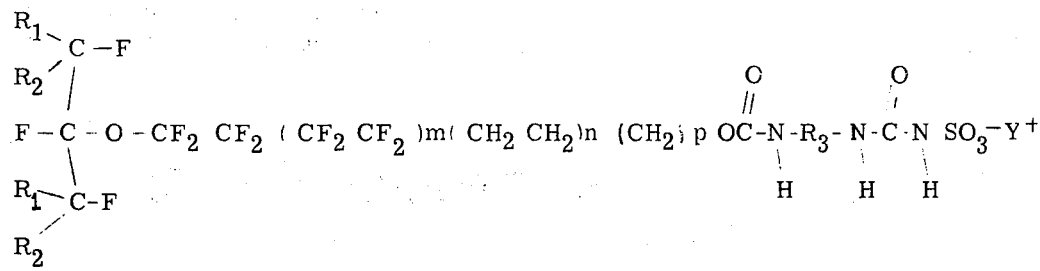

wherein $R_1$ and $R_2$ independently are fluorine or perfluoroalkyl of 1–2 carbon atoms; $m$ and $n$ are integers from 0–10; $R_3$ is tolylene; Y is a positively changed tertiary amine residue which may be substituted with straight or branched chain aliphatic and alicyclic groups and $p$ is an integer from 0–1 with the proviso that when $p$ is 0, $n$ must be at least one.

2. A compound of the formula

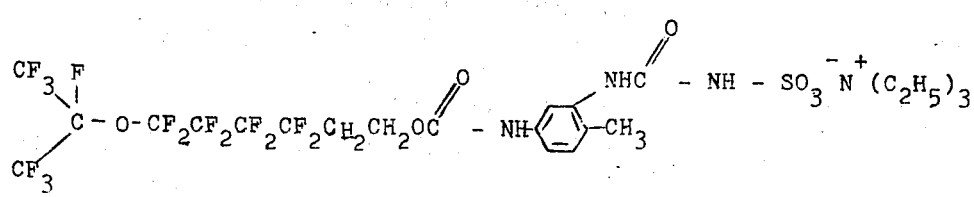

3. A compound of the formula

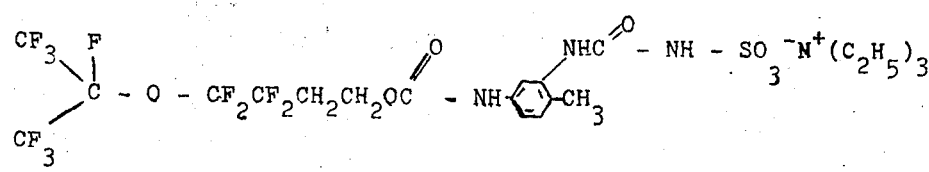

* * * * *